(12) United States Patent
Cavallaro et al.

(10) Patent No.: US 8,977,585 B2
(45) Date of Patent: Mar. 10, 2015

(54) SIMULATION SYSTEM

(75) Inventors: Richard H. Cavallaro, Mountain View, CA (US); John Roy Borton, Los Gatos, CA (US)

(73) Assignee: Sportsvision, Inc., Chicago, IL (US)

( * ) Notice: Subject to any disclaimer, the term of this patent is extended or adjusted under 35 U.S.C. 154(b) by 219 days.

(21) Appl. No.: 13/351,554

(22) Filed: Jan. 17, 2012

(65) Prior Publication Data
US 2012/0233105 A1  Sep. 13, 2012

Related U.S. Application Data

(60) Provisional application No. 61/450,797, filed on Mar. 9, 2011.

(51) Int. Cl.
*G06N 5/02* (2006.01)
*G01S 5/16* (2006.01)
*G01S 17/74* (2006.01)
*G06N 7/06* (2006.01)
*A63F 13/40* (2014.01)
*A63B 24/00* (2006.01)

(52) U.S. Cl.
CPC . *G01S 5/16* (2013.01); *G01S 17/74* (2013.01); *G06N 7/06* (2013.01); *A63F 13/10* (2013.01); *A63B 2024/0025* (2013.01); *A63B 2225/54* (2013.01); *A63F 2300/6027* (2013.01)
USPC ............................................................ 706/46

(58) Field of Classification Search
USPC ............................................................ 706/46
See application file for complete search history.

(56) References Cited

U.S. PATENT DOCUMENTS

| 5,860,862 | A | 1/1999 | Junkin | |
|---|---|---|---|---|
| 6,080,063 | A | 6/2000 | Khosla | |
| 6,648,760 | B1 * | 11/2003 | Nicastro | 463/23 |
| 7,351,150 | B2 | 4/2008 | Sanchez | |
| 7,634,798 | B2 | 12/2009 | Watson | |
| 7,743,070 | B1 | 6/2010 | Blumberg | |
| 2002/0034980 | A1 | 3/2002 | Lemmons | |
| 2002/0119823 | A1 | 8/2002 | Beuscher | |
| 2005/0148388 | A1 * | 7/2005 | Vayra et al. | 463/32 |
| 2005/0239551 | A1 | 10/2005 | Griswold | |
| 2006/0281552 | A1 * | 12/2006 | Bulusu | 463/41 |
| 2008/0311996 | A1 * | 12/2008 | Belton et al. | 463/42 |
| 2008/0312010 | A1 * | 12/2008 | Marty et al. | 473/447 |
| 2010/0035672 | A1 | 2/2010 | Root | |
| 2010/0048096 | A1 * | 2/2010 | Lorelli et al. | 446/456 |

* cited by examiner

*Primary Examiner* — Kakali Chaki
*Assistant Examiner* — Michael Zidanic
(74) *Attorney, Agent, or Firm* — Vierra Magen Marcus LLP

(57) ABSTRACT

A simulation system is proposed that makes use of historical and live data sensed for one or more objects (e.g., people, cars, balls, rackets, etc.). An event will include one or more decision points. A choice of an action to take at a decision point is made. That chosen action will be simulated based on the historical and live data. The simulation can be compared to the actual action taken in the event as a way to judge the choice. Although the choice of action to take at the decision point is simulated, the real event is not altered by the choice.

27 Claims, 9 Drawing Sheets

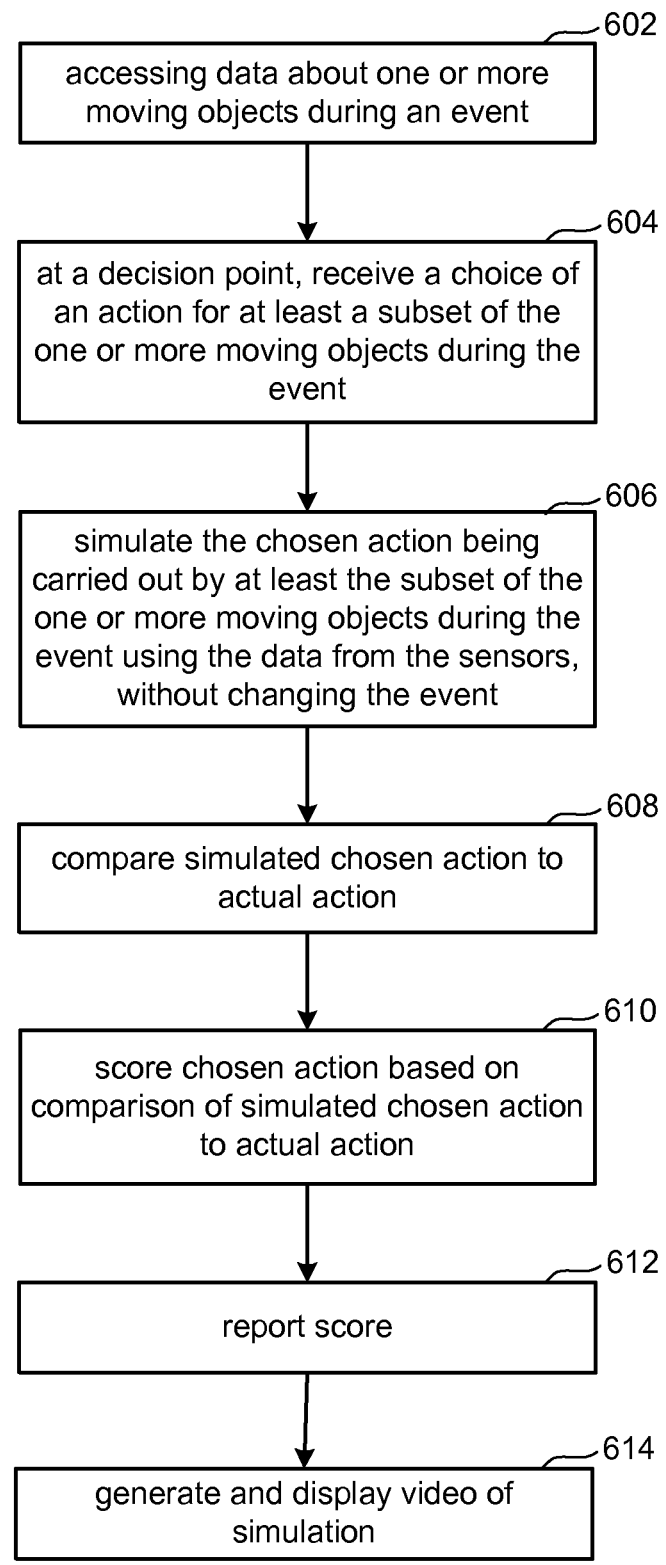

SIMULATION SYSTEM

This application claims priority from U.S. Provisional Application 61/450,797, "Simulation System," filed on Mar. 9, 2011, incorporated herein by reference in its entirety.

BACKGROUND OF THE INVENTION

1. Field

The technology described herein relates to simulation systems.

2. Description of the Related Art

Simulation systems have been used in video games, technology training, defense industries and prediction systems. For example, simulations systems in video games allow a user to operate a simulated participant against other simulated participants in a virtual environment. Other systems, allow a user to view a real event and make predictions about what will subsequently occur at the event. The user can then monitor the event and see whether their prediction was accurate.

BRIEF DESCRIPTION OF THE DRAWINGS

FIG. 5 is a flow chart describing one embodiment of a process for performing a simulation.

DETAILED DESCRIPTION

Figure 1:
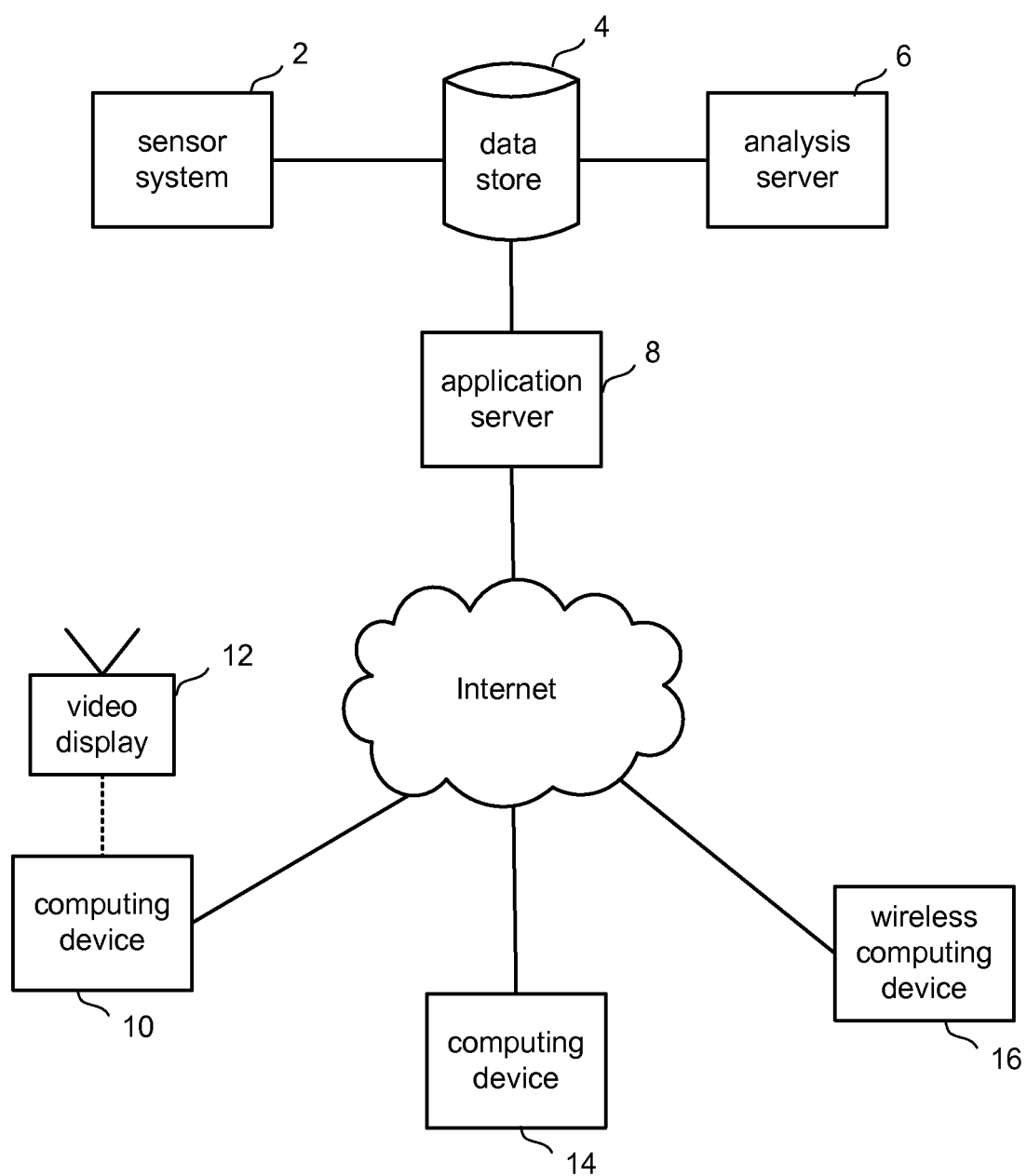
FIG. 1 is a block diagram of one embodiment of a simulation system.

A simulation system is proposed that makes use of historical and/or live data sensed from or about one or more objects (e.g., people, cars, balls, rackets, etc.) at an event. The event includes one or more decision points. The user will choose an action to take at a decision point. A choice of an action is different than a prediction. A prediction is a guess at what will happen next, while a choice of an action to take at a decision point is the user indicating what the user wants to happen next. The user's choice of an action to take at a decision point is simulated based on the historical and/or live data. The simulation can be compared to the actual action taken in the event as a way to judge the user's choice. Although the choice of action to take at the decision point is simulated, the real event is not altered by the choice.

In one example embodiment, the simulation system can be used in conjunction with a sporting event (or other type of event). A decision point in the sporting event can be a situation where a coach has a decision to make. A user can decide what the user thinks is best. When the sporting event resumes after the decision point, the system will simulate the user's decision about what to do next using historical and current data. The user will also be able to view what really happens in the event based on the coach's decision. The decision point may have an impact window. The simulation will be performed during the impact window, concluding at the end of the impact window (or sooner). At the end of the impact window, the system can compare the results of the simulation to the results that actually happened in the sporting event to determine whether the user made a better choice than the coach.

For example, in American football, a user can choose to call the next play for the offense. Based on statistics and past performance of the offense and the defense, the simulation system can determine the effectiveness of the user's choice of play. Then the user will observe the actual play. Additionally, the system will track the various players and ball during the play to determine the effectiveness of the actual play. The results of the real play can be compared to the results of the simulated play to see if the user chose better than the coach. In one example implementation, the user can be scored based on how much better or worse the user chose than the coach. The user's score can be compared to other user's scores.

In a race car example, a user watching an automobile race can make decisions about operating the race car. For example, the user may choose whether or not to perform a pit stop for the race car. The simulation system could then simulate what would happen to the car during the remainder of the race or during an impact window after the decision and compare the results to what the race car actually did.

In another example, the simulation system can be used for training purposes. For example, a pilot training to operate an airplane can watch a video of a flight. That video will include multiple decision points. The pilot in training can make decisions at each of those decision points and the simulation system will simulate the results of those decisions and compare them to what was actually performed in the exemplar training flight depicted in the video. The pilot in training will be scored based on whether the pilot in training's decisions were better or worse than the pilot in the video. Other example implementations can also be used with the technology described herein.

FIG. 1 is a block diagram depicting one example of a system that can perform the simulations discussed herein. FIG. 1 shows sensor system 2 in communication with and providing data to data store 4. Sensor system 2 can include one or multiple components that generate location and state information about one or more moving and non-moving objects at an event. The objects being tracked can include people, animals, cars, balls, pucks, rackets, equipment, vehicles, etc. The state information can include any information that describes the current condition of the object. In one example of a race car, the state information can include amount of gas in the gas tank, tire pressure, speed, rotations per minute, gear position, temperature, oil pressure, etc. For a person, state information can include temperature, heart rate, blood pressure, level of oxygen in the blood, etc. Other information can also be detected. The information from sensor system 2 is stored in a data store 4, which can be any database (or other data structure) known in the art.

Analysis server 6 can access the data in data store 4 in order to analyze the data stored and make conclusions about actions that were performed in events for which the sensor system 2 obtained data. In one example, analysis server 6 can have a set of templates stored that explain how actions correlate to various data that can be obtained by the sensor system 2. For example, in a football game, analysis server 6 can include templates to recognize various formations of a team and/or recognize plays based on movement of the individual players. Alternatively, based on location data, analysis server 6 can determine when a race car has entered the pit area. Note that FIG. 1 shows sensor system 2 and analysis server 6 in direct communication with data store 4. In other embodiments, sensor system 2 and analysis server 6 can communicate with data store 4 via the Internet, other type of network, or other communication means.

FIG. 1 shows the application server 8 in communication with data store 4. In various embodiments, application server 8 will be directly connected to data store 4, communicate with data store 4 via the Internet, communicate with data store 4 via another type of network, or communicate with data store 4 via any other communication means known in the art. Application server 8 can access the data in data store 4 as well as the results of analysis server 6 (which are also stored in data server 4). That information can be used to perform the simulation for one or more users who can communicate with application server 8 via the Internet. In one embodiment, application server 8 can include one or more physical computing devices that provide load balancing, security and other services standard in the art.

Many different types of client devices can access application server 8. FIG. 1 shows three examples of client devices including computing device 10, computing device 14 and wireless computing device 16. Computing device 10 may include a desktop computer, laptop computer, set top box, television with computing capabilities, or other computing device. In one embodiment, computing device 10 communicates via the Internet using a wired connection. In one embodiment, computing device 10 is connected to or used in conjunction with a video display 12, which can be a television or other type of video monitor. Video display 12 can be connected to computing device 10 or can be unconnected to computing device 10. For example, video display 12 can receive its video signal from computing device 10, a satellite dish, a cable television connection, or standard airwaves. In one example, the video of an event is broadcast and received at video display 12 while information is transmitted from application server 8 to computing device 10 (and vice/versa) via the Internet.

Computing device 14 is a client device that includes video playback capabilities. Therefore, both the data from application server 8 and the video from the event being monitored are provided to computing device 14 for presentation to the user. Computing device 14 connects to the Internet via a wired connection such as a LAN. The examples of computing device 14 include a desktop computer, laptop computer, or other computing device. The video received by computing device 14 can be a standard television broadcast sent over cable television, satellite dish, traditional airwaves or via the Internet (or other network).

Computing device 16 is a wireless computing device, which may include a cellular telephone, tablet computer, laptop computer, or other wireless computing device which can connect to the Internet or other network in order to communicate with application server 8. In one embodiment, wireless computing device 16 will also receive the video signal of the event in order to simultaneously display the video signal to a user. In another embodiment, wireless computing device 16 can be used in conjunction with the television (or other video monitor) in order to provide the data from application server 8 to a user while the user is watching the event on the associated television (or other video monitor). Wireless computing device 16 may received the video from a satellite dish, a WiFi connection, a cellular connection or other wireless means.

In one embodiment, the client device (e.g. computing device 10, computing device 14, or computing device 16) will implement a user interface that prompts a user to enter a decision at each decision point (or at a subset of decision points). In one embodiment, information about the various options that can be chosen will be provided to the appropriate client device from application server 8. In one embodiment, once the user makes a choice, that choice is provided from the client to application server 8. Application server 8 will access the data from prior events, and data from the current event in order to perform a simulation of what would happen at the event if the user's choice was implemented.

In one embodiment, application server 8 will perform the simulation based on data from prior events, data from the current event before the decision point and data from the current event after the decision point. For example, in a football application where a user is choosing the next play, application server 8 performs a simulation based on statistics from previous games and the current game, as well as taking into account the formation that the defense implements after the user chooses the play. Application server 8 can then compare the results of the simulation with the results that actually happened in the real game to see whether the user chose a better play than the team's coach. Application server will then score the user's choice and provide indication of the user's score back to computing device 14, which will display the results to the user. Note that the actual event being monitored (e.g., the football game or auto race) are not changed or altered in any way by the user's choice. The next time there is a decision point, that decision point is based on the real event and does not take into account any of the user's previous choices.

In another embodiment, the simulation can be performed on the user's client device (e.g., computing device 10, computing device 14, computing device 16, or other). In this case, the user's client device will contact application server 8 to obtain the relevant historical data and data for the current event. That information can be provided using TCP/IP or any other suitable protocol Based on the user's choice and the data received from application server 8, the client device will perform the simulation, compare the simulated results to the actual results (obtained from application server 8) and then provide the result to the user.

In another alternative, the client device will perform the simulation and send the results to application server 8 so that application server 8 can compare the simulated results to the actual results from the event. Application server 8 can determine a score based on the comparison and send the score back to the client. Alternatively, application server 8 can send the results of the comparison to the client so that the client determines the score.

The system can be used during a live event. Alternatively, a live event can be recorded such that the recorded video and recorded data can be provided to the user at a later time for participation and simulation at a later time.

Figure 2:
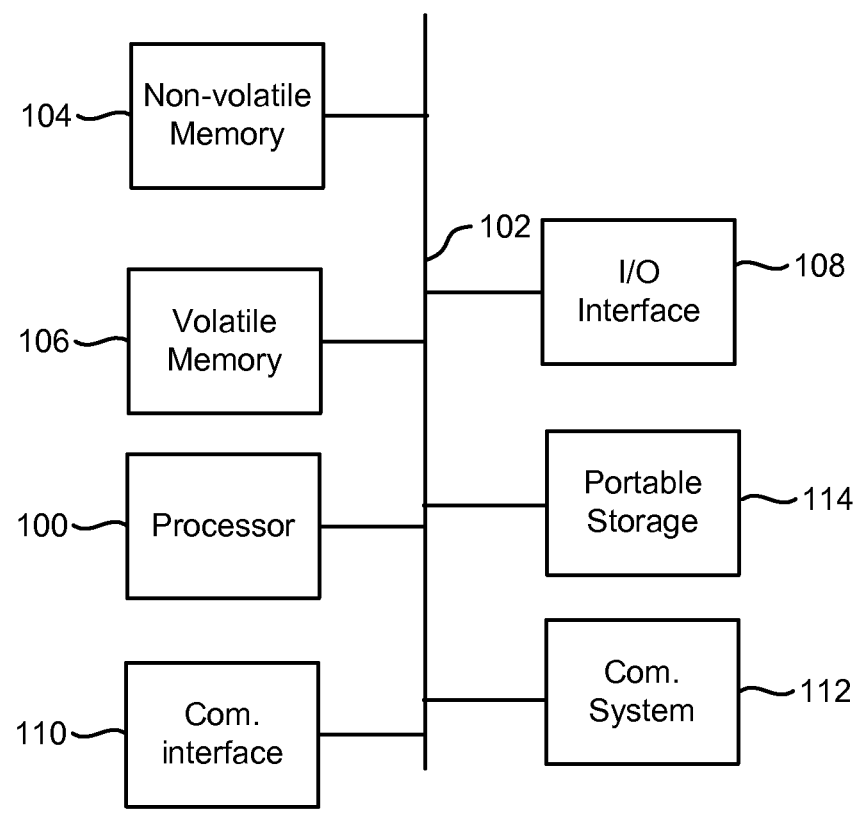
FIG. 2 is a block diagram of one embodiment of a computing system.

FIG. 2 is a block diagram of one example embodiment of a computing system. The computing system of FIG. 2 can be used to implement any of the computing devices (6, 8, 10, 14 and 16) of FIG. 1 as well as any of the computing devices of sensor system 2. The computing system of FIG. 2 includes a processor 100 connected to one or more buses 102. Processor 100 can be a single core processor, multi-core processor, multiprocessor unit, or the like. Also connected to bus system 102 are nonvolatile memory 104, volatile memory 106, I/O interface 108, communication interface 110, communication system 112 and portable storage device 114. Nonvolatile memory 104 can include flash memory, EEPROM, hard disk drives, or other types of nonvolatile storage. Volatile memory can include DRAM or other types of volatile memory. In one embodiment, nonvolatile memory 104 is used to store program code and long term data, while volatile memory 106 is used by processor 100 for short term storage. I/O interface 108 includes components that enable the computing system to provide an interface with the user. For example, I/O interface 108 can be used to implement a keyboard, mouse, monitor, speaker, touch screen display, fingerprint sensor, etc. Communication interface 110 includes components to allow the computing system of FIG. 2 to communicate with other computing systems. Examples of communication interface 110 include a modem, router, Ethernet interface, other type of network interface, etc. Communication system 112 includes hardware and/or software to implement a cellular communication or WiFi link. Portable storage 114 can include any type of removable memory card (e.g., Compact Flash, SD, mini-SD, etc.) or removable disk storing data or program code.

Figure 3:
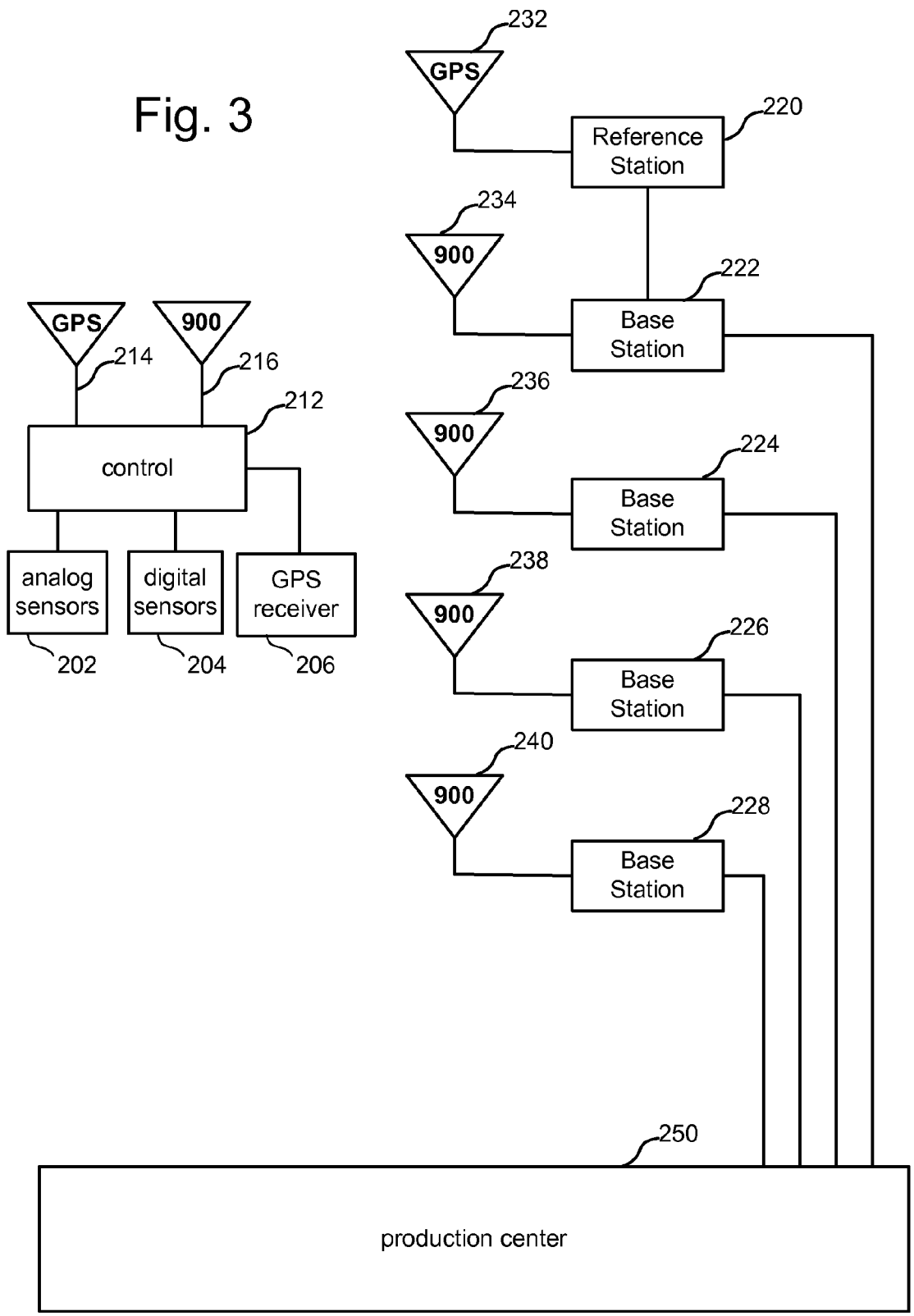
FIG. 3 is a block diagram of one embodiment of a tracking system.

FIG. 3 is a block diagram of one embodiment of a tracking system 2 used to automatically track state and location information of moving vehicles, such as race cars during a race. In one embodiment, the system of FIG. 3 is used to track a three dimensional location of each of the cars during an automobile race, in real time, as well as various state parameters (e.g., fuel level, tire pressure, RPM, instantaneous velocity, gear position, temperature, driver heart rate, oil level, etc.)

FIG. 3 shows control system 212 connected to GPS antenna 214, 900 MHz antenna 216, analog sensors 202, digital sensors 204 and GPS receiver 206. In one embodiment, control system 212 is mounted to the object being tracked. In the example pertaining to an automobile race, there will be a control system 212 mounted to each car being tracked. Thus, although FIG. 1 shows only one control system 212, multiple control systems 212 are likely to be used.

The analog sensors 202 and digital sensors 204 are used to sense state information for the car that the control system 212 is mounted to. Example sensors include a brake sensor for determining the position of the brake pedal, an RPM sensor for determining the instantaneous RPM, throttle sensor for determining the position of the throttle, gear sensors for determining the position of the transmission gears, temperature sensors, sensors for determining the fuel level, sensors for determining information about the driver, etc. Some of these sensors are digital sensors and some of these sensors are analog sensors.

GPS receiver 206 is connected to GPS antenna 214. GPS antenna 214 is used to receive signals from one or more GPS satellites. The signals received from the GPS satellites are used to determined the instantaneous three dimensional location of the control system 12, and, therefore, the car that the control system 212 is mounted to.

900 MHz antenna 216 is used to communicate with various base units (e.g. 222, 224, 226 and 228). In one embodiment, the system includes four base stations 222, 224, 226, 228. Base station 222 includes 900 MHz antenna 234, base station 224 includes 900 MHz antenna 236, base station 226 includes 900 MHz antenna 238 and base station 228 includes 900 MHz antenna 240. In one embodiment, there can be more than four base stations or less than four base stations. It is contemplated that base stations will be located at different parts of the racetrack (or other event). The base stations transmit data to and receive data from each of the control systems 212 via the 900 MHz antennas. Data from each of the base stations is communicated to production center 250 using DSL modems or other communication means.

Base station 222 includes GPS reference station 220 with GPS antenna 232. This reference station is surveyed with accuracy to determine its location. Reference station 220 receives GPS information from GPS satellites and determines differential GPS error correction information. This error correction information is communicated from the GPS reference station (via base station 222) to production center 250 for eventual retransmission to each of the base stations. The base station will send the information to each of the control systems 212. In another embodiment, the system of FIG. 1 can use pseudolites to provide additional data to the GPS receivers in the DAPS units.

More information about the system of FIG. 3, and similar systems, can be found in United States Patent Application Publication No. 2003/0048218, "GPS Based Tracking System," [published on May 13, 2003, incorporated herein by reference in its entirety.

Figure 4A:
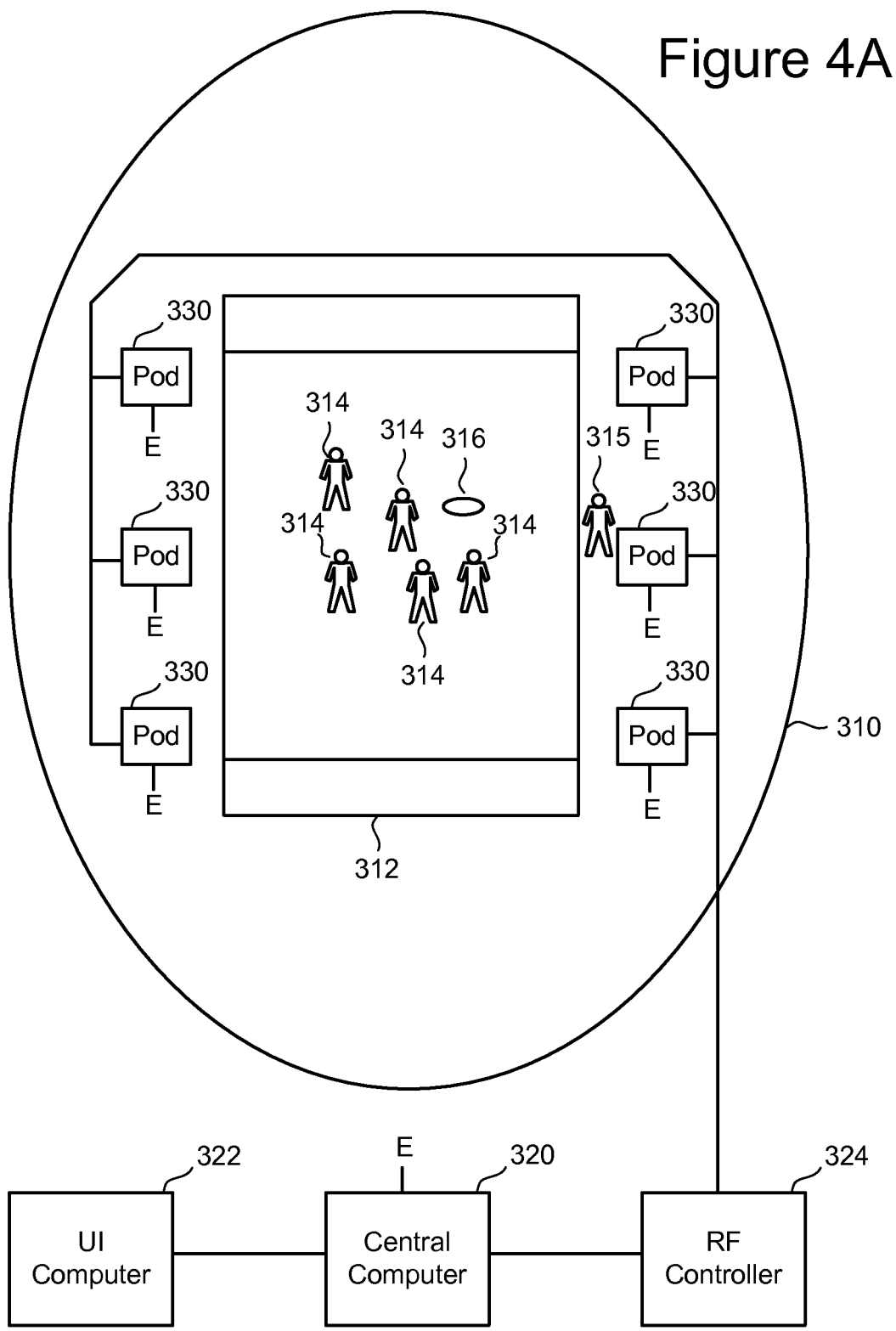
FIG. 4A-4C are block diagrams of one embodiment of a tracking system.

FIG. 4A discloses another embodiment of a tracking system 2 that can automatically and simultaneously track multiple objects that are moving concurrently. The system can be used at sporting events or other types of events, and is not limited to any type of event or environment. One example used below is to track players and a ball, puck, club. etc. at a sporting event (e.g., American football game, soccer game, hockey game, etc.). In one example, the players each have a transponder in their helmet that responds to a query with an infra-red (IR) pulse. The system queries the players in a round-robin fashion, querying the players on the field more frequently than those on the bench or sidelines.

In one example embodiment of FIG. 4A, twenty infra-red (IR) cameras (pointed at the field) are mounted at six locations around the stadium. In one example implementation, these cameras are sensitive only to the narrow band of IR emission transmitted by the transponders in the players helmets. Additionally, the cameras are shuttered to coincide with the transponder pulses. In one example, all cameras open their shutters for $1/10,000$th of a second, and they do this two hundred times per second. In another embodiment, the system opens the cameras' shutters one hundred and fifty six times per second. Each time the cameras open their shutter, one (or more) of the player transponders flashes a $1/10,000$th second IR pulse. Due to the very fast shutter pulse synchronized with the IR pulse, along with an IR filter on each camera that permits only the very narrow band of IR transmitted by the transponders, each of the cameras should see one bright dot (per target) on a generally dark background. In one embodiment, to further distinguish the transponder from the background, the system uses a differencing algorithm to subtract an image formed by combining images immediately before and after the target frame from the target frame. Different timing and wavelengths can be used.

One aspect of this tracking system is the individual addressing of each object (e.g. player/helmet) to be tracked. The stadium is to be instrumented with six RF transmitters in communication with a central control computer. More or fewer than six RF transmitters can also be used. A Central Computer will send a message out to each of the transmitters for each IR video frame (e.g., two hundred frames per second) to indicate which player is to be addressed. These six transmitters are distributed around the field to add spatial diversity (and, therefore, robustness) to the RF addressing scheme. Each RF transmitter in turn will then send out a short message indicating which helmet transponder (player) is to pulse, and a countdown indicating the time that the pulse must occur. This countdown increases addressing robustness significantly through temporal diversity. The transponder need only receive a message packet from one of the six transmitters to know when it is to output a pulse. At the specified output time, each of the six transmitter modules will send out a simultaneous pulse to the co-located IR cameras (as many as four, or a different number, at each transmitter location). Each IR camera then captures an image while the target transponder is outputting its IR pulse, and sends that image to its dedicated co-located computer. The co-located computer finds the target (or targets) in the image, and sends the target's pixel coordinates and description to the Central Computer for tracking This active addressing approach allows for automatically tracking multiple targets simultaneously, and alleviates the need for manual interaction to identify targets as specific players. The system will use "adaptive" triggering in order to track the most important targets at the highest temporal resolution. One embodiment includes identifying locations for all players on the field (or ice or other surface) five times per second. The system will also identify players that are off the field once every two seconds. In addition, referees and fixed registration landmarks will each be identified once per second. The moment a player (previously off the field) is detected as being on the field, that player's frequency of location identification will automatically be increased to five times per second. Other frequencies can also be used.

Alternative embodiments include identifying two or more players in a single frame if those players cannot be confused from one another (e.g. players on opposite team benches). Another alternative includes moving a player up in the list to be identified in the event that player wasn't identified in the last round, is carrying the ball, has just undergone unusually high acceleration, etc. In another alternative, the system will modify the sequence by identifying skilled players (e.g., quarterback) at a higher frequency than others (e.g., linemen).

FIG. 4A shows football stadium 310 that includes football field 312. On field 312 are players 314 and ball 316. In some games, there can be multiple balls. The system described below will automatically track players 314 and ball 316 as they simultaneously (or not simultaneously) move about field 312 and move off field 312. For example, FIG. 4A shows players 314 on field 312 and player 315 off field 312. Player 315 can also be tracked simultaneously with the players 314. Additionally, the system can determine whether the players are on or off the field.

The automatic tracking system includes Central Computer 320 in communication with a User Interface Computer (UI computer) 322 via Ethernet or RS-232. The system also includes RF Controller 324 in communication with Central Computer 320 via RS-232, or other communication means. Surrounding field 312 are six transmitter/sensor pods ("pods") 330. Each pod 330 includes one or more RF transmitters and one or more sensors. In one embodiment, each pod 330 includes four IR cameras that operate as sensors. Other types of cameras can also operate as sensors. In some embodiments, some of the pods 330 will include four IR cameras/sensors and other pods will include more or fewer than four IR cameras/sensors so that there is a total of twenty (or a different number of) IR cameras/sensors in the system. Each of the pods 330 will communicate with Central Computer 320 via Ethernet (indicated by "E" in FIG. 4A). Each of the pods 330 will also communicate with RF Controller 324 via an RS-422 line. In one embodiment, an RS-422 line will be connected to RF Controller 24 and wired throughout the stadium. Each of pods 320 can connect to that RS-422 line in a daisy-chain configuration. In some embodiments, the pods are connected in parallel on the RS-422 line.

In general, a human operator will interact with UI Computer 322 to see the real-time operational results of the tracking system of FIG. 4A, and provide instructions to the system. Central Computer 320 controls the operation of the automatic tracking system, determines the actual locations of the objects being tracked and provides commands to the other components in order to perform the tracking. For example, Central Computer 320 will indicate to RF Controller 324 the frequency with which various objects should be tracked. In one embodiment, Central Computer 320 issues each player triggering commands itself. It does this through the RF Controller, but doesn't tell the controller anything of the frequency the player will be tracked. RF Controller 324 will send commands to each of the transmitters in pods 330 instructing the transmitters which players should have their position sensed at which time. That information will be transmitted wirelessly using the RF transmitters in pods 330 to transponder circuits on players 314 and 315. At the appropriate times, wireless sensors in pods 330 will detect players 314/315 and transmit information about the detection back to Central Computer 320 via the Ethernet (E) so that Central Computer 320 can calculate the three-dimensional locations of each of the players 314/315.

In one example, pods 330 are located above the field level. For example, they can be mounted in portions of the stadium that are raised above the field level. In one embodiment, they are positioned around the field to provide spatial diversity so that all portions of the field are in view of multiple pods 330.

In one embodiment, each pod 330 includes four IR cameras/sensors. In one example, the cameras/sensors can be digital video cameras, digital still cameras, analog video cameras or analog still cameras. In one embodiment, the cameras can be dedicated for IR sensing. In another embodiment, the cameras can be manufactured for sensing a range, or ranges of, wavelengths and filters can be used to restrict the sensing to IR or other specific ranges. Each of the cameras of pod 330 is connected to a dedicated camera computer via Ethernet.

In one embodiment of a tracking system for an American football game, each of the football players will be wearing a helmet. The helmet will instrumented with a transponder. That transponder will receive an RF signal from one or more transmitters of pods 330 instructing that transponder to send out an electromagnetic signal. In response to receiving the RF signal from a transmitter, the appropriate helmet transponder will send out its electromagnetic signal at the designated time. In one embodiment, the electromagnetic signal is a continuous wave infrared burst. For example, the helmets will include a set of IR emitting LEDs. The cameras at a pod 330 will be commanded to capture an exposure that largely coincides with the timing of the IR signal from the helmet's transponder. One or more of cameras will ideally sense the IR signal from the helmet's transponder. The IR signal will be appear as a cluster of pixels in the captured image of the camera. The output images from cameras are sent to camera computers to identify where in the image the IR signal source is detected. The camera computers will then transmit data packets to Central Computer 20 via the Ethernet.

Figure 4B:
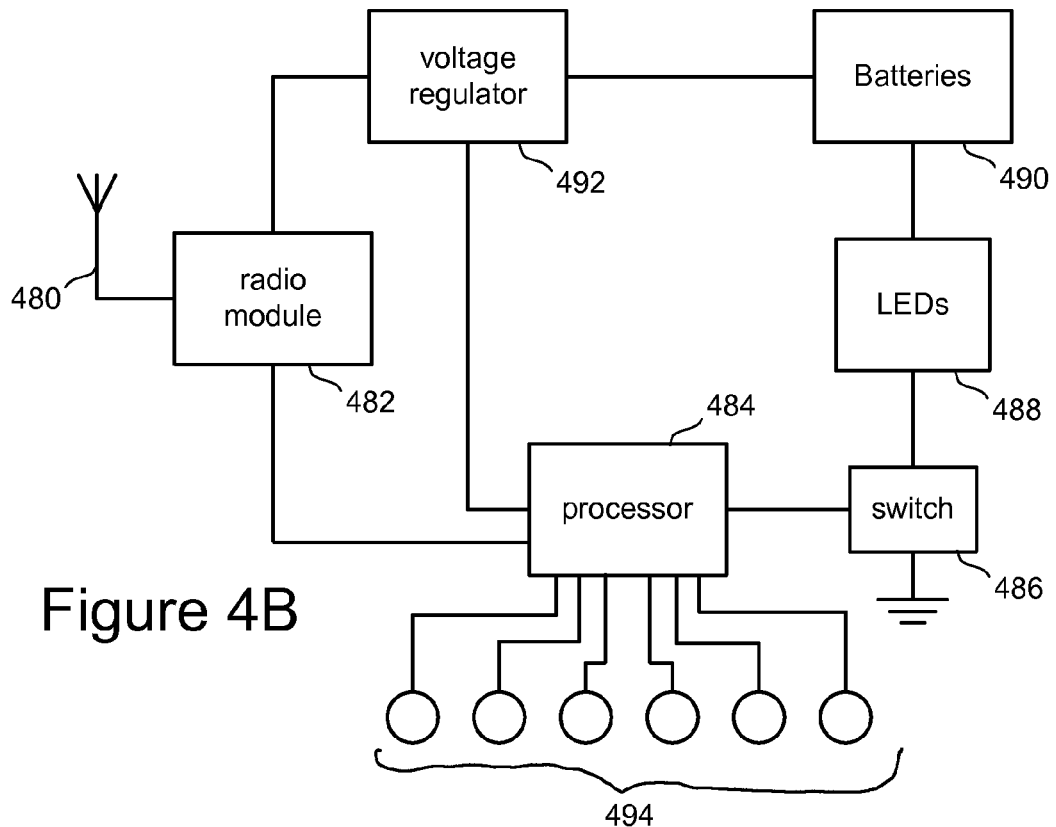

FIG. 4B is a block diagram depicting one example embodiment of the components of the helmet transponder circuit that is mounted inside the helmet of a player. In this example, the helmet transponder circuit includes an antenna 480, radio module 482, processor 484, switch 486, LEDs 488, batteries 490, voltage regulator 492 and accelerometers 494. Processor 484 is connected to radio module 482, switch 486 and voltage regulator 492. Switch 486 is also connected to ground and LEDs 488.

A radio module in pods 330 sends out an RF signal with data which indicates which helmet transponder should output an IR pulse. This RF signal is broadcast to all the helmet transponders on the field. Therefore, every player is capable of receiving that transmission. Because there can be reasons why a particular helmet transponder will not receive a transmission from a particular transmitter, there are six transmitter/sensor pods so that there are six transmitters transmitting the same information (at different times). Each of the helmets will receive the six signals (or less than the six signals) via antenna 480 and radio module 482. The data received will be sent to processor 484. Based on the signal received at processor 484, the processor will determine whether it is the particular helmet transponder circuit's turn to transmit its IR pulse. When it's time for the helmet transponder to transmit an IR pulse, processor 484 will actuate switch 486 to turn on LEDs 488 for $\frac{1}{10,000}$th of a second. LEDs 488 are also connected to batteries 490. Voltage regulator 492 provides power to radio module 482 and processor 184 from batteries 490.

FIG. 4B also shows a set of set single axis accelerometers 494. In other embodiments, multi axis accelerometers can also be used. These accelerometers 494 are distributed around the head of the player by appropriately mounting them in the helmet. The accelerometers allow processor 484 to automatically determine whether a potentially dangerous impact has occurred (e.g., causing a concussion). The use of the accelerometers allows the transmission of such impact data in real time (or near real-time). Other sensors can also be includes to detect the players heart rate, temperature, and blood pressure. The information from these sensors can be transmitted to the pods 330 using an RF signal or by coding the information in the IR signal.

Figure 4C:
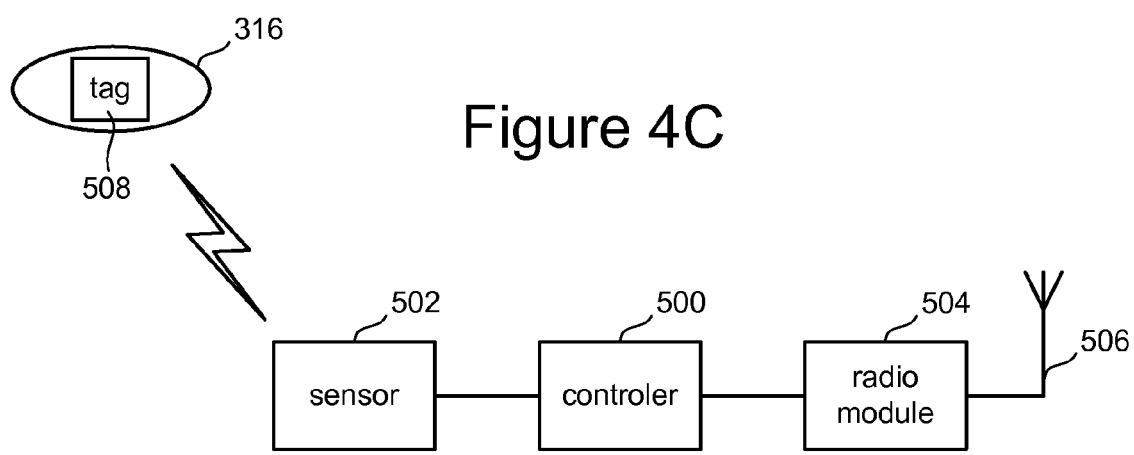

The tracking system also includes multiple options for tracking ball 316 (or other objects). In one embodiment, the system uses an RFID tag in ball 316. FIG. 4C shows ball 316 with an RFID tag 508 embedded in ball 316. For example, the RFID tag can be between the bladder and leather of the ball. RFID tag 508 can also be mounted in other portions of the ball. In one embodiment, each player will have one or more RFID tag reading circuits positioned on the player. For example, the RFID circuits can be positioned on shoulder pads, pants, the helmet, elbow pads, gloves, wristbands, etc. A player could have one RFID tag circuit or multiple RFID tag circuits.

In one embodiment, an RFID tag circuit positioned on a player or at a fixed location near the field includes controller 500 in communication with sensor 502 and radio module 204. The radio module 504 is connected to antenna 506. Sensor 502 can be any standard RFID tag reader known in the art that is small. Controller 500 can be any suitable processor known in the art. Radio module 504 can be CC2520 from Texas Instruments, or another suitable radio module. The system will also include a battery/power source.

In embodiments that have multiple RFID tag circuits mounted on a player, each of the RFID tag circuits can include its own sensor, controller and radio module. In other embodiments, each RFID tag circuit will include its own sensor and controller, but will share a common radio module. In other embodiments, each RFID tag circuit will include its own sensor, but will share a common controller and radio module. The multiple sensors should (but are not required to be) distributed throughout the player's body. Sensor 502 is used to automatically sense that tag 508 is in proximity of sensor 502. In other words, sensor 502 is used to determine that the ball 316 is in proximity to player 314 (or other object for which a RFID tag circuit is mounted). Upon detecting the presence of tag 508, the sensor will provide a signal to controller 500 which will instruct radio module 504 to send a signal (via antenna 506) indicating: current time, an ID for sensor 502 and an ID for tag 508. In some cases for tracking the ball, the time can be sensed at the listening station (helmet, sideline, etc.), and the ball ID will most likely not be needed.

In one embodiment, will be a set of listening stations positioned around field 312. In one implementation, the listening stations can be at field level; however, other positions can also be utilized. Each listening station will include an RFID tag circuits similar to FIG. 4C.

In the above discussion, football was used as an example. Another example can include tracking hockey players and an ice hockey puck. An example of tracking an ice hockey puck is found in U.S. Pat. No. 5,862,517, incorporated by reference herein in its entirety. When tracking hockey players, the electronics described for the football helmet can also be placed in the hockey helmet. Alternatively, the electronics can be placed on top of the hockey helmet in a channel, commonly found on hockey helmets. Additionally, in an alternative embodiment, the hockey helmet may only include six LEDs on top of the helmet because it is possible to put a set of cameras on the catwalk/rafters at the top of the arena. Other types of objects can also be tracked in other types of events (live or recorded). More information about the system of FIGS. 4A-4C can be found in U.S. patent application Ser. No. 12/906,012, "Tracking System," filed on Oct. 15, 2010, incorporated herein by reference in its entirety.

Additional information about tracking systems can be found in U.S. Pat. Nos. 5,912,700; 6,292,130; 6,304,665; 6,456,232; 6,728,637; 6,744,403; 6,133,946; and 7,341,530; all of which are incorporated by reference in their entirety.

FIG. 5 is a flow chart describing one embodiment of a process for performing a simulation using the technology described herein. The method of FIG. 5 can be used with the components depicted in FIGS. 1-4C. In step 602 of FIG. 5, the simulation engine will access data about one or more objects during the event. As described above, sensor system 2 (see FIGS. 3-4c) will be continuously obtaining data about objects at the event and that data will be stored in data store 4. In step 602, the system performing the simulation will access that data. If the simulation is being performed on application server 8, then it is application server 8 that is accessing the data in step 602. If the simulation is being performed on a client device, then it is the client device that is accessing the data in step 602. The data does not need to be accessed during the event, as the system can be used to simulate using a replay of the event. The access data tracks information (e.g., location and state information) about one or more objects at the event.

In step 604, a decision point is reached in the event. The system performing the simulation will receive a choice of an action to be carried out at the decision point. For example, a use may input a choice of action using a graphical user interface (GUI). That action is intended to be carried out (perhaps virtually) by at least a subset of the objects being tracked at the event. In one embodiment, multiple objects will be tracked (location information and/or state information) but only one object will carry out the chosen action. In another embodiment, multiple objects will be tracked, and a subset of two or more of those objects are intended to carry out the action. An example of one object carrying out an action would be a race car entering a pit area or not entering the pit area. An example of multiple objects carrying out an action would be an offense performing a play in a football game. An action can be any function, process, act, etc. Examples of actions can include performing a play, shooting a basketball, pitching a baseball, operating a motor vehicle in a particular manner, maintaining a motor vehicle (e.g. add gas, change tires, etc.), run a particular route, etc. Note that the while the actions chosen may be performed by a subset of the objects being tracked, the system will continue to sense data for all objects being tracked, not just those performing the chosen action.

In step 606, the simulation system (e.g. application server 8 or the user's client) will simulate the chosen action being carried out by the at least the subset of the one or more objects during the event using the data from the sensors (obtained in step 602). The simulation is an imitation of a real state of affairs or process. It is the act of imitating the behavior of some situation by using analogous techniques of representing the real world with a computer program. As it is a simulation, the result will not affect the actual event. Thus, if a user calls a play for an offense to perform, that play will not actually be performed by the offense and thus the game will not be affected. The next time the user makes a decision, the results of the user's previous decision has no effect on the current state of the game. The chosen action is not actually carried out by the subset of the one or more moving objects. Although the simulation is of the action being performed during the game, the simulation need not occur during the game. In some cases, the simulation is performed for a short period of time in order to arrive at a result. In other cases, the simulation could go on for a very long period of time. In some situations, an impact window is created by the system such that the simulation will end no later than the end of the impact window. This impact window can be defined by the designer of the system. For example, in an auto race the user may choose for a race car to have a pit stop or not have a pit stop. The effects of that decision can affect the entire race. The designer of the application can choose to have the impact window run for the entire race or a subset of the race. In one example, an impact window for a decision whether to have a pit stop or not to have a pit stop can run for fifteen minutes, thirty minutes, etc.

The simulation of step 606 will provide a result. For example, when a user calls a play in an American football game, the result of the simulation can determine whether the offense gained any yards and, if so, how many yards were gained. In the example of a user choosing whether to have a pit stop for a race car, the result could be that the user runs out of gas at a certain point in the race or the user finishes higher in the race standings. The results of the simulation are compared against what actually happened in the event in step 608. The sensors that are tracking information about the one or more moving objects will continuously track data about those objects. That information is continually being provided to data store 4 and continually made available to the simulation engine in application server 8 or the user's client device, as well as analysis server 6. That data sensed by the sensors after the decision point is used to determine what actually happened in the event. For example, analysis server 6 can use one or more templates or definitions of results to determine what actually happened in the game or event based on the data sensed after the decision point. The simulation results can be compared to the actual results to see whether the user's choice of action was a better choice than what actually happened in the event. For example, if the user chose not to do a pit stop and the simulation determined that the car would run out of gas, then the user's decision was not as good as the real decision to perform a pit stop. In a football game, if the user chose to throw a pass and the simulation determined that the pass would be for a touchdown (score), while the real event was a running play that gained no yards, then the user's choice was better than the actual coach's choice. Step 608 will determine which choice was better and will use some measurable difference (e.g. yards gained, better position in race) in order to quantify the difference.

In step 610, the system will determine a score for the user's choice of action. The better the user did as compared to the real event, the more points the user will receive. The worse the user's choice was as compared to the real event, the more points the user will lose. Other scoring schemes can also be used. The magnitude of the score will be based on the magnitude of the difference determined in step 608. No one particular type of scoring system is required.

In step 612, the score is reported to the user (e.g., in a GUI on the user's client device). In one embodiment, the score can automatically be provided to a user's social networking site or on some other type of web site that displays scores of users. In one embodiment, many users can interact with the system to provide choices at the same time. All those users will receive their own scores and the scores can be compared in step 612. In some embodiments, multiple users can interact with the system for different events. For example, one user may be choosing plays for a first football game and a second user will be choosing plays for a second football game. In this case, when the scores are compared, it may be unfair for a user who's playing against a coach that makes better decisions to be compared to a user who's playing against a coach that makes poor decisions. Therefore, scores can be handicapped based on how good the coaches are that the users are second guessing. For example, a user going against an average coach would receive the exact score calculated in 610. A user second guessing the best coach in the league may receive 20% bonus points from the score calculated in step 610. A user going against the worst coach in the league can have the user's score reduced by 15%.

In step 614, the system can generate a video of the simulation. For example, if the user was calling a play for a team in football, the simulation system can create an animation of the offense performing the play and the defense defending against the play based on the statistics and other data used by the simulation system. In one example implementation, the various software engines used by video games to create sports video games can be used to generate and display the video of the simulation. During typical event, the process of FIG. 5 will be repeated many times.

Figure 6:
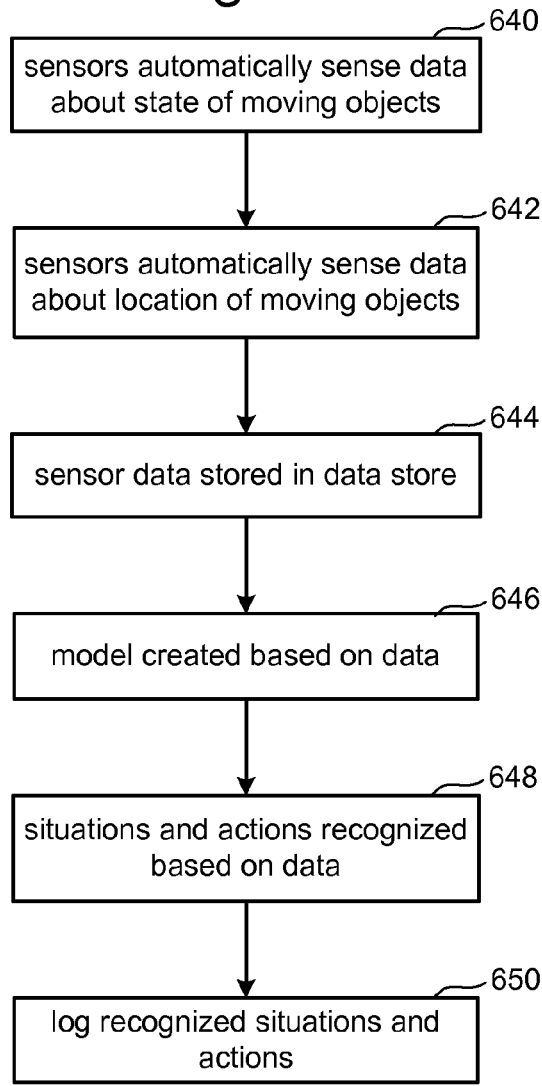
FIG. 6 is a flow chart describing one embodiment of a process for sensing data about one or more objects at an event.

The process described by FIG. 5 is carried out by application server 8 and/or the user's client device. While the process of FIG. 5 is being performed, one or more sensor systems 2 are creating the data that are accessed in step 602. FIG. 6 is a flow chart described in one embodiment of a process performed by sensor system 2 to generate the data that is accessed in step 602. The process of 602 is performed continually during an event so that the simulation system can use data from past events, data from the current event that was created prior to the decision point and data from the current event after the decision point. All three buckets of data will be used in the simulation in order to determine a simulation result. In some embodiments, less than all three buckets will be used in the simulation, depending on implementation and application. Note that although the data is obtained during the event, the simulation need not happen during the event. While the simulator will determine what the various objects would have done during the event had the decision been carried out, that simulation does not actually have to happen during the event. As explained above, the simulation can be performed after the event using data from data store 4.

In step 640, the sensors will automatically sense data about the state of one or more moving objects. In step 642, the sensors will automatically sense data about the location of one or more moving objects. In step 644, the sensor data from step 640 and step 642 are stored in data store 4. In step 648, analysis server 6 will access the data in data store 4 and recognize one or more situations and actions being performed at the event. In step 650, analysis server 6 will log the recognized situations and actions. Therefore, the simulator will be able to access the raw data as well as the log of recognized situations and actions, all of which can be used in the simulation of step 606.

Figure 7:
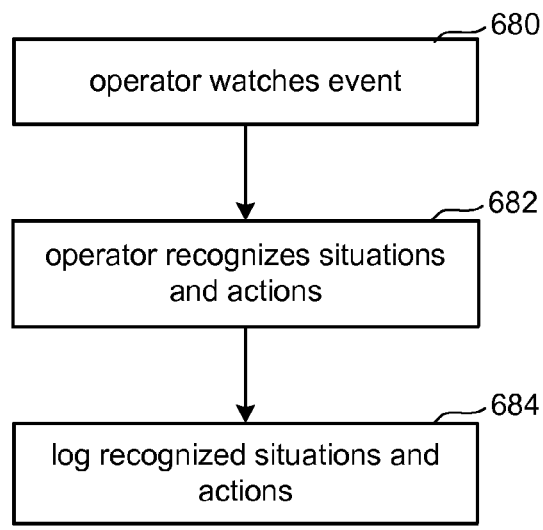
FIG. 7 is a flow chart describing one embodiment of a process for generating data about one or more objects at an event.

In another embodiment, a human can manually create some or all of the tracking data to be accessed in step 602. FIG. 7 is a flow chart describing an example process of a human operator manually creating some or all of the tracking data to be accessed in step 602. In step 680 of FIG. 7, a human operator will watch the event. In step 682, the operator will recognize a situation or action that occurs during the event. In step 684, the operator will log the recognized situations and/or actions by creating an entry in an electronic log that identifies the time and action or situation occurs and what that action or situation is. The operator can use codes to represent each particular situation or action. The processes of FIGS. 6 and 7 can be performed continuously and repeatedly during an event so that data is continuously being generated during the event.

Figure 8:
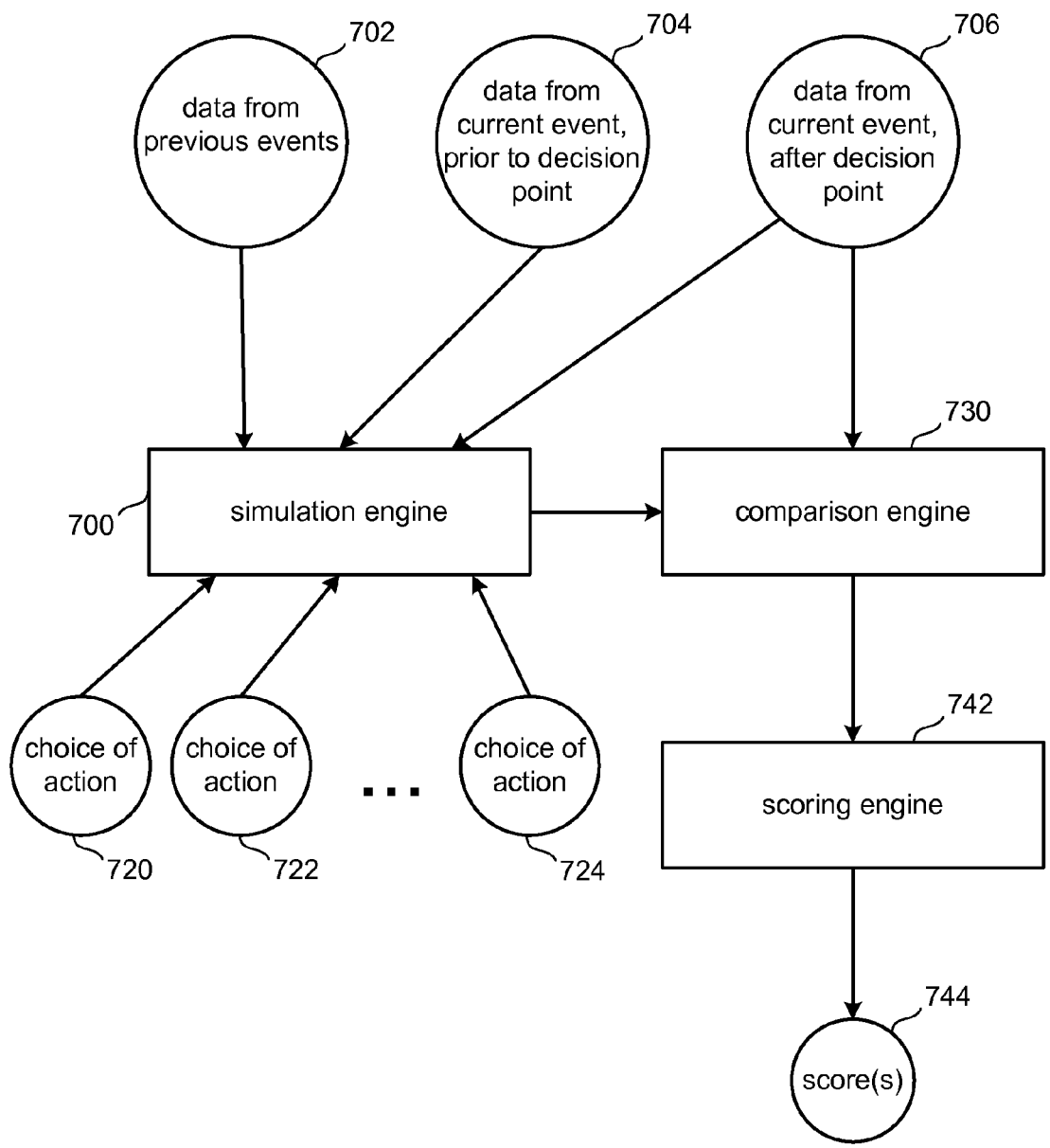
FIG. 8 shows one embodiment software modules and data flow for a simulation system.

FIG. 8 depicts one embodiment of software modules and data flow for simulating, as described above. FIG. 8 shows simulation engine 700 which is a software module that performs the simulation of step 606. Simulation engine 700 can be residing on application server 8, computing device 10, computing device 14, wireless computing device 16, or another suitable computing device. Simulation engine 700 receives various forms of data including data from previous event 702, data from the current event (prior to decision point) 704, and data from the current event (after the decision point) 706. Simulation engine 700 will also receive various choices of action (720, 722, . . . , 724) by one or more users. In an embodiment where the simulation is performed on the user's client device, it is likely that all of the choices of action will be provided by one single user. However, it is possible that a client device is shared by multiple users so that multiple users can provide their own choices. In other embodiments where the simulation is being performed by application server 8, many different client devices operated by different users can provide their choices to application server 8.

Note that the process of FIG. 5 does not indicate when the choice of action to carry out is received by the simulation server. That is because the choice can be provided by the user at many different times. For example, the user may be prompted to provide the choice at a decision point and respond at that point. Alternatively, the user can make decisions in advance. The decisions will be received by simulation engine 700 and used to perform step 606. Decision can also be made after the corresponding decision point.

The results generated by simulation engine 700 are provided to comparison engine 730. In one embodiment, comparison engine 730 is a software module on the same computing device as simulation engine 700. In another embodiment, comparison 730 can be on a different computing device. Comparison engine 730 will perform step 608 of FIG. 5, and compare the simulated results to what actually happened in the event. Comparison engine 730 may also receive the data from the current event (after the decision point) 706 directly from data store 4, from application server 8, and/or from analysis server 6. That data 706 may also include the results of analysis server 6.

The results of the comparison from step 608 are provided from comparison engine 730 to scoring engine 742. In one embodiment, scoring engine 742 is a software module residing on the same computing device as simulation engine 700 and comparison engine 730. In other embodiments, scoring engine 742 can be on a different computing device. Scoring engine 742 will generate a score (implementing step 610 of FIG. 5) based on the comparison of the simulated result of the chosen action to the actual action carried out in the event. Scoring engine 742 will report the score 744. For example, the score can be reported graphically on the user's client device.

Figure 9:
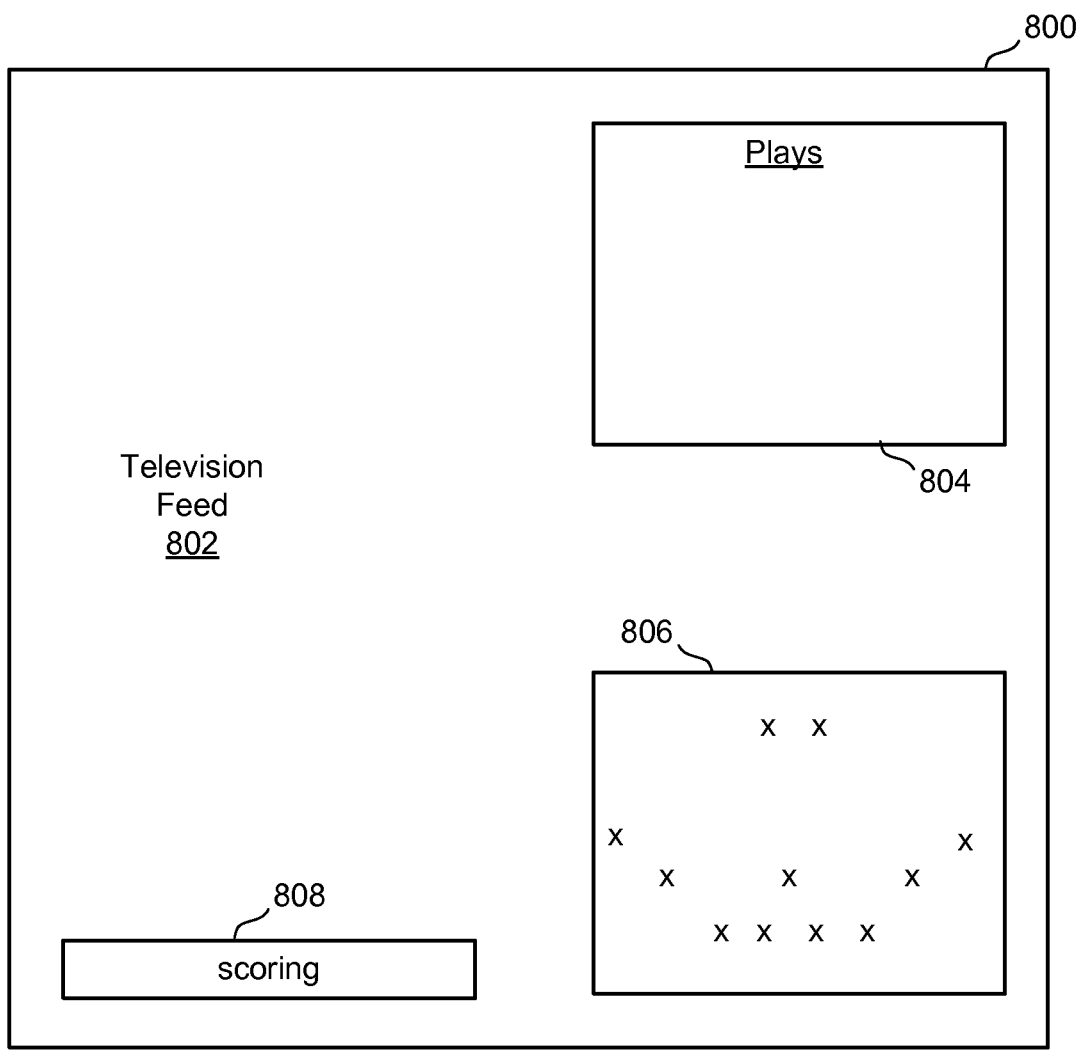
FIG. 9 depicts a graphical user interface.

FIG. 9 provides an example of a GUI 800 that can be implemented on the user's client device. The GUI includes television feed 802 which can be a video of the event (live or recorded). The GUI will also include a number of overlays including overlay 804, overlay 806 and overlay 808. Overlay 804 provides the options for the current decision point. In the example where the user is interacting with the video of a football game, overlay 804 will list all the plays that the user can choose. Overlay 806 provides data from sensor system 2. In the example of the football game, overlay 806 will show the current formation of the defense in the video. Overlay 808 will report the instantaneous score for the most recent decision as well as an ongoing aggregate score. In other embodiments, overlay 808 can include scores of friends or other players.

The above described technology can be used to implement many different types of applications, one proposed example application is an American football fantasy game in which the user chooses the next play for the offense to run. While the team's offense is in a huddle, the user has a chance to choose the next play. The system will use the historical data from previous games, data from the current game before the decision point and data after the decision point to simulate what would have happened with the user's chosen play. In one respect, the user is actually competing with the team's coach who is calling the plays. Scores of different users can be compared. In one embodiment, the system can be set up for three different types of players: casual user, mid-level user, and expert user. The casual user can choose to provide the next play whenever the user wants. The choices of plays would be indicated in overlay 804 of GUI 800. The casual user would be scored when the casual user provides a next play. The mid-level user may have a playbook so that the mid-level player will just have to enter codes from the playbook. In one embodiment, the mid-level user would be required to pick a play for every single play of the game, and would lose points if the mid-level user does not choose a play. In an expert level, the user may be able to substitute in other skill level players into the offense and the simulation will take into account the performance of the other skill level players based on the other skill level players' prior data. This option will be useful for those persons who play fantasy leagues. Thus, in this embodiment, the decision point is the start of every play and the impact window is the duration of the play.

In an automobile race example, the decision points can be to pit stop or not pit stop, change tires or not change tires, change two tires or four tires, add fuel to a car or not add fuel to a car, short or long pit stop, tight/loose adjustments, operate in fuel save mode (increase lap time) in order to save fuel, etc. The impact window can be determined based on the creator of the application. This application can also have multiple levels of play. For example, a casual user can choose to provide input at any decision point, but not required for all decision points. An expert user may be required to provide decisions for every decision point. Some embodiments may include team owner role where a user is responsible for multiple cars and can choose to make decisions for all cars at the same time or one car at a time. For example, a team owner can draft or activate up to four cars per race. During the race a team owner can move (cirtually) from pit box to pit box between any of the teams' cars and assume the role of fantasy crew chief of that particular car while on his pit box. While the team owner can move freely between team cars at any time, he/she is obligated to be acting as fantasy crew chief for at least one team car at all times. Scoring can be based on how any one car performs or how the entire team performs.

It is possible that multiple impact windows can overlap. Some embodiments will limit the number of impact windows that are open for any period of time. If a user makes more decisions than allowable open impact windows, the oldest impact window will be cancelled and that decision will no longer be scored.

One embodiment includes accessing data from sensors used to track information about one or more moving objects during an event, receiving a choice of an action for at least a subset of the one or more moving objects during the event, and simulating the chosen action being carried out by at least the subset of the one or more moving objects during the event using the data from the sensors.

One embodiment includes a communication interface, a memory and a processor in communication with the memory and communication interface. The processor accesses data from sensors used to track information about one or more moving objects during an event, receives a choice of an action for at least a subset of the one or more moving objects during the event and simulates the chosen action being carried out by at least the subset of the one or more moving objects during the event using the data from the sensors.

One embodiment includes accessing a log of occurrences that happen at an event, receiving a choice of an action for at least a subset of the one or more moving objects during the event, and simulating the chosen operation being carried out by at least the subset of the one or more moving objects during the event using the log of occurrences.

One embodiment includes accessing data from sensors used to track information about one or more moving objects during an event and simulating an alternative action of a particular object of the one or more moving objects during a particular time period of the event using the data from the sensors, the alternative action does not actually occur for the particular object during the particular time period of the event.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for performing a simulation, comprising:
  accessing data from sensors used to track information about one or more real moving objects during an event, wherein the event includes a decision point, and wherein the data from sensors used to track information includes (i) data sensed during the event prior to the decision point, (ii) data sensed during the event subsequent to the decision point, and (iii) data sensed at prior events;
  receiving a choice of an action for at least a subset of the one or more real moving objects during the event, wherein the choice of the action is for implementation at the decision point; and
  simulating the chosen action being carried out by at least the subset of the one or more real moving objects during the event using (i) the data sensed during the event prior to the decision point, (ii) the data sensed during the event subsequent to the decision point, and (iii) the data sensed at prior events;
  wherein subsequent the decision point there is an actually carried out action by the subset of the one or more real moving objects during the event;
  wherein the chosen action that is simulated differs from the actually carried out action by the subset of the one or more moving real objects during the event; and
  wherein a simulated result of the simulating the chosen action being carried out by at least the subset of the one or more real moving objects during the event differs from an actual result of the actually carried out action by the subset of the one or more real moving objects during the event.

2. The method of claim 1, wherein:
  the chosen action is not actually carried out by the subset of the one or more moving objects.

3. The method of claim 1, wherein:
  the event does not change as a result of the choice of the action or the simulation.

4. The method of claim 1, wherein:
  the data from sensors used to track information includes data sensed about the subset of the one or more real moving objects and data sensed about real moving objects not in the subset; and
  the simulating uses the data sensed about the subset of the one or more real moving objects and data sensed about real moving objects not in the subset.

5. The method of claim 1, wherein:
  the event includes an impact window that runs after the decision point; and
  the simulating the chosen action is performed after the decision point and concludes at an end of the impact window.

6. The method of claim 1, further comprising:
  generating a video that depicts the simulating.

7. The method of claim 1, wherein the simulating the chosen action comprises:
  recognizing a predetermined action of the one or more real moving objects during an event;
  accessing historical data about the predetermined action and the chosen action; and
  determining a chance of success for the chosen action based on the historical data.

8. The method of claim 1, wherein:
  the method further comprises displaying, over a video display of the event, a list of options of action to take place at the decision point;
  the chosen action is one of the options;
  the data from sensors used to track information includes data tracking location and movement of the one or more moving objects during an event; and
  the method further comprises displaying the data tracking location and movement of one or more moving objects during the event.

9. The method of claim 1, further comprising:
  comparing the simulated chosen action to an actually performed action for the subset of the one or more moving objects; and
  determining a score based on the comparing.

10. The method of claim 9, wherein:
  the determining the score includes factoring in a handicap associated with a coach for the subset of the one or more real moving objects.

11. The method of claim 9, further comprising:
receiving additional choices for action of at least the subset of the one or more real moving objects during the event;
simulating the additional chosen actions being carried out by at least the subset of the one or more real moving objects during the event using the data from the sensors;
comparing the simulated chosen action and the simulated additional chosen actions to an actually performed action for the subset of the one or more real moving objects;
determining scores for each choice based on the comparing; and
reporting the scores.

12. The method of claim 1, wherein:
the subset of the one or more real moving objects is a single race car.

13. The method of claim 12, wherein:
the choice of an action is whether to make a pit stop.

14. The method of claim 1, wherein:
the subset of the one or more real moving objects is multiple players on a team.

15. The method of claim 1, wherein:
the choice of an action is what offensive play to call.

16. The method of claim 1, wherein:
the data from sensors used to track information about one or more moving real objects during an event includes location data and state data.

17. The method of claim 1, wherein:
the event is a live event; and
the accessing, receiving and simulating are performed in real time during the live event.

18. The method of claim 1, wherein:
the accessing, receiving and simulating are performed while viewing a recording of the event after the event has completed.

19. An apparatus for performing a simulation, comprising:
a communication interface;
a memory; and
a processor in communication with the memory and communication interface, the processor configured to access data from sensors used to track information about one or more real moving objects during an event, receive a choice of an action for at least a subset of the one or more real moving objects during the event and simulate the chosen action being carried out by at least the subset of the one or more real moving objects during the event using the data from the sensors;
wherein the event includes a decision point;
wherein the choice of the action is for implementation at the decision point;
wherein the data from sensors used to track information includes data sensed during the event prior to the decision point, data sensed during the event subsequent to the decision point, and data sensed at prior events; and
wherein the processor is configured to simulate the chosen action being carried out by at least the subset of the one or more real moving objects during the event using the data sensed during the event prior to the decision point, the data sensed during the event subsequent to the decision point, and the data sensed at prior events;
wherein subsequent the decision point there is an actually carried out action by the subset of the one or more real moving objects during the event;
wherein the chosen action that is simulated by the processor differs from the actually carried out action by the subset of the one or more moving real objects during the event; and wherein a simulated result of the processor simulating the chosen action being carried out by at least the subset of the one or more real moving objects during the event differs from an actual result of the actually carried out action by the subset of the one or more real moving objects during the event.

20. The apparatus of claim 19, wherein:
the chosen action is not actually carried out by the subset of the one or more real moving objects.

21. The apparatus of claim 19, wherein
the data from sensors used to track information includes data sensed about the subset of the one or more real moving objects and data sensed about real moving objects not in the subset; and
the processor simulates the chosen action being carried out using the data sensed about the subset of the one or more real moving objects and data sensed about real moving objects not in the subset.

22. The apparatus of claim 19, wherein
the processor compares the simulated chosen action to an actually performed action for the subset of the one or more real moving objects and determines a score based on the comparing.

23. A method for performing a simulation, comprising:
accessing a log of occurrences that happen at an event, wherein the event includes a decision point, and wherein the log of occurrences includes data about occurrences that happen at the event prior to the decision point and data about occurrences that happen at the event subsequent the decision point;
receiving a choice of an action for at least a subset of the one or more real moving objects during the event, wherein the choice of the action is for implementation at the decision point; and
simulating the chosen action being carried out by at least the subset of the one or more real moving objects during the event using the data about occurrences that happen at the event prior to the decision point and the data about occurrences that happen at the event subsequent the decision point, which are included in the log of occurrences;
wherein subsequent the decision point there is an actually carried out action by the subset of the one or more real moving objects during the event;
wherein the chosen action that is simulated differs from the actually carried out action by the subset of the one or more moving real objects during the event; and
wherein a simulated result of the simulating the chosen action being carried out by at least the subset of the one or more real moving objects during the event differs from an actual result of the actually carried out action by the subset of the one or more real moving objects during the event.

24. The method of claim 23, wherein:
the chosen action is not actually carried out by the subset of the one or more real moving objects.

25. The method of claim 23, wherein:
the log of occurrences also include data about occurrences that happened at prior events; and
the simulating also uses the data about occurrences that happened at prior events, which are included in the log of occurrences.

26. A method for performing a simulation, comprising:
accessing data from sensors used to track information about one or more real moving objects during an event, wherein the event includes a particular time period, and wherein the data from sensors used to track information includes (i) data sensed during the event prior to the particular time period and (ii) data sensed during the event subsequent to the particular time period; and simulating an alternative action of a particular real object of the one or more real moving objects during the particular time period of the event using the data from the sensors, wherein the alternative action does not actually occur for the particular real object during the particular time period of the event, and wherein the simulating uses (i) the data sensed during the event prior to the particular time period and (ii) the data sensed during the event subsequent to the particular time period;

wherein the alternative action that is simulated differs from an actually carried out action by the particular real object of the one or more real moving objects during the particular time period; and wherein a simulated result of the simulating the alternative action differs from an actual result of the actually carried out action by the particular real object of the one or more real moving objects during the particular time period.

27. The method of claim 26, wherein:

the data from sensors used to track information also includes (iii) data sensed at prior events; and the simulating also uses (iii) the data sensed at prior events.

* * * * *